United States Patent
Bauer et al.

(10) Patent No.: US 9,651,452 B2
(45) Date of Patent: May 16, 2017

(54) METHOD AND DEVICE FOR CONTROLLING A POWERTRAIN TEST STAND

(71) Applicant: KRISTL, SEIBT & CO. GESELLSCHAFT M.B.H., Graz (AT)

(72) Inventors: Robert Bauer, Graz (AT); Bernd Pressl, Graz (AT); Martin Baschnegger, Bregenz (AT); Martin Wipfler, Lieboch (AT)

(73) Assignee: KRISTL, SEIBT & CO. GESELLSCHAFT M.B.H., Graz (AT)

( * ) Notice: Subject to any disclaimer, the term of this patent is extended or adjusted under 35 U.S.C. 154(b) by 0 days.

(21) Appl. No.: 15/110,382

(22) PCT Filed: Jan. 8, 2015

(86) PCT No.: PCT/AT2015/050007
§ 371 (c)(1),
(2) Date: Jul. 7, 2016

(87) PCT Pub. No.: WO2015/103658
PCT Pub. Date: Jul. 16, 2015

(65) Prior Publication Data
US 2016/0327451 A1 Nov. 10, 2016

(30) Foreign Application Priority Data
Jan. 9, 2014 (AT) .............................. A 50011/2014

(51) Int. Cl.
*G01M 17/007* (2006.01)
*G01M 13/02* (2006.01)

(52) U.S. Cl.
CPC .............................. *G01M 13/025* (2013.01)

(58) Field of Classification Search
USPC ............... 73/115.01, 115.02, 115.05, 115.06, 73/116.01, 116.05, 116.06, 118.01
See application file for complete search history.

(56) References Cited

U.S. PATENT DOCUMENTS

| 4,468,958 A | 9/1984 | Takeshita |
| 6,768,940 B2 | 7/2004 | Akiyama et al. |

(Continued)

FOREIGN PATENT DOCUMENTS

| AT | 010301 U2 | 12/2008 |
| AT | 508031 B1 | 10/2010 |

(Continued)

OTHER PUBLICATIONS

Rill, G., "Simulation von Kraftfahrzeugen," Grundlagen und Fortschritte der Ingeniurwissenschaften (Fundamentals and Advances in the Engineering Sciences), Braunschweig : Vieweg, 2007 Reprint, Available as Early as Apr. 1994, Regensburg, Germany, 210 pages.

(Continued)

*Primary Examiner* — Eric S McCall
(74) *Attorney, Agent, or Firm* — McCoy Russell LLP

(57) ABSTRACT

Disclosed are a method and a control device for controlling a powertrain test stand comprising a driving machine and a driven machine. According to the invention, a torque supplied by the driving machine is controlled, a reference variable ($M_x$) for controlling the torque of the driving machine in order to dampen vibrations between the driving machine and the driven machine being modified depending on a current speed ($n_{ist}$) of the driving machine in relation to a predefined value ($M_{ist}$), the reference variable ($M_x$) being determined from a model of a virtual tire.

17 Claims, 4 Drawing Sheets

(56) References Cited

U.S. PATENT DOCUMENTS

| | | | |
|---|---|---|---|
| 8,001,835 B2 * | 8/2011 | Engstrom | G01L 3/20 73/116.05 |
| 8,006,548 B2 | 8/2011 | Akiyama et al. | |
| 9,134,712 B2 | 9/2015 | Kokal et al. | |
| 9,234,820 B2 * | 1/2016 | Akiyama | G01M 13/025 |
| 9,360,395 B2 * | 6/2016 | Engstrom | G01M 17/0074 |
| 2010/0251811 A1 | 10/2010 | Akiyama et al. | |
| 2011/0303000 A1 * | 12/2011 | Engstrom | G01M 17/0074 73/116.06 |
| 2012/0166154 A1 | 6/2012 | Johnson et al. | |
| 2013/0098147 A1 * | 4/2013 | Bauer | G01M 1/10 73/118.01 |
| 2013/0283900 A1 * | 10/2013 | Engstrom | G01M 17/007 73/115.05 |
| 2015/0107347 A1 * | 4/2015 | Bauer | G01M 13/025 73/115.05 |
| 2015/0219529 A1 * | 8/2015 | Akiyama | G01M 13/025 73/115.01 |
| 2016/0116367 A1 | 4/2016 | Pfister et al. | |
| 2016/0139002 A1 * | 5/2016 | Akiyama | G01M 13/025 73/115.01 |

FOREIGN PATENT DOCUMENTS

| | | | |
|---|---|---|---|
| AT | 512483 A2 | 8/2013 | |
| DE | 3808524 C2 | 11/1990 | |
| DE | 10247347 A1 | 5/2003 | |
| DE | 102010049687 A1 | 5/2011 | |
| DE | 102010049689 A1 | 5/2011 | |
| EP | 1333268 A2 | 8/2003 | |
| EP | 1037030 B1 | 8/2006 | |
| WO | 2011038429 A1 | 4/2011 | |
| WO | 2013126940 A1 | 9/2013 | |

OTHER PUBLICATIONS

Hirschberg, W., "TM_simple: A Simple to Use Tyre Model," MATLAB Version 4.0, Graz University of Technology, Mar. 13, 2009, Graz, Austria, 5 pages.

ISA European Patent Office, International Search Report Issued in Application No. PCT/AT2015/050007, Apr. 8, 2015, WIPO, 4 pages.

Rill, G., "Simulation von Kraftfahrzeugen," Grundlagen und Fortschritte der Ingeniurwissenschaften (Fundamentals and Advances in the Engineering Sciences), Braunschweig : Vieweg, 2007 Reprint, Available as Early as Apr. 1994, Regensburg, Germany, 213 pages. (Submitted with Partial Translation).

International Bureau of WIPO, International Preliminary Report on Patentability Issued in Application No. PCT/AT2015/050007, Jul. 14, 2016, WIPO, 5 pages.

* cited by examiner

METHOD AND DEVICE FOR CONTROLLING A POWERTRAIN TEST STAND

CROSS REFERENCE TO RELATED APPLICATIONS

The present application is a U.S. National Phase of International Patent Application Serial No. PCT/AT2015/050007, entitled "METHOD AND DEVICE FOR CONTROLLING A POWERTRAIN TEST STAND," filed on Jan. 8, 2015, which claims priority to Austrian Patent Application No. A50011/2014, entitled "METHOD AND DEVICE FOR CONTROLLING A POWERTRAIN TEST STAND," filed on Jan. 9, 2014, the entire contents of each of which are hereby incorporated by reference for all purposes.

TECHNICAL FIELD

The invention relates to a method for controlling as well as a control device of a powertrain test stand comprising a driving machine and a driven machine, wherein a torque supplied by the driving machine is controlled by an inner control loop, and comprising an outer control loop for controlling the reference variable of the inner control loop depending on a current speed of the driving machine, so that a reference variable for controlling the torque of the driving machine to dampen vibrations between the driving machine and the driven machine being modified in accordance with a current speed of the driving machine in relation to a predefined value.

BACKGROUND AND SUMMARY

In a powertrain test stand, the component to be tested (hereinafter also called test specimen), in most cases, is not necessarily connected to the environment, as is the case at its future site. For example, a powertrain on the test stand is connected to a driving machine and one or several load machines or—general—driven machines via relatively rigid shafts instead of being in contact with the road via tires. On the test stand, this mostly results in weakly damped (and thus pronounced) resonance frequencies, which the test specimen will not encounter at its actual site. If these resonance frequencies are excited by one of the machines, the resulting vibrations may heavily influence the test result or even result in destroying the test specimen and/or the test stand. Therefore, measures for damping these resonance frequencies on the test stand are necessary. The known methods will be listed below.

Above all, the use of softer, more damped connecting shafts may reduce the resonance frequencies and additionally also dampen them to a higher extent. If in normal operation the resonance frequencies are no longer excited, the problem will be solved. The low-pass effect of the soft connecting shaft turns out to be disadvantageous. In addition, quite a significant amount of power can be transformed in the shaft by friction (the shaft gets hot and might get destroyed).

Apart from such passive damping, methods for the active damping have been known, in which an additional torque corresponding to a shaft damping is applied on the driven machine. For example the differential angular velocity of the shaft, i. e. the difference between the measured speeds on the driven machine and the driving machine can be used for this (cf. e. g. DE 38 08 524 C2). The disadvantage of using the two current speeds on the driven side and the driving side is that these speeds are possibly available only in a noise-infested and considerably delayed way, e. g. due to the bus transmission time and/or filtering of the signal. In the worst case, applying such a distorted damping torque may cause the powertrain test stand to become particularly instable.

The need for high accuracy and dynamics when applying the two speeds was already recognized in EP 1 333 268 A2. It is proposed to estimate the differential angular velocity with the help of the measured shaft torque: The measured shaft torque is differentiated, weighted with a correction factor and supplied to the torque target value of the driven machine as correction value. The differentiation of a measured quantity, however, has the disadvantage that the constantly present measurement noise is intensified considerably. Indeed, the differentiated torque might be filtered by a low-pass filter, however, this method will get instable in the case of higher resonance frequencies, thus highly limiting the practical use. Furthermore, in the case of large test stands including a play and many distributed masses (e. g. in the case of powertrains with matching gears) only the first shaft close to the machine will be damped; the other shafts will remain undamped.

In addition, WO 2013/126940 A1 shows a method in which the measured shaft torque is not differentiated but as such is applied to the torque target value of the driven machine either directly or after a low-pas filtering. This measure, which initially comes as a surprise, results in very good damping in particular in the case of high resonance frequencies. However, if large masses are present on the test stand or the natural frequency to be damped is small, the attainable damping effect will be small.

Other, comparatively more complicated methods for the active damping show alternative options of using a measured torque (e. g. DE 102 47 347 A and U.S. Pat. No. 4,468,958 A) or try to predict the resonance behavior of the test stand (e. g. AT 010 301 U2 and U.S. Pat. No. 8,006,548 B2).

In connection with a highly realistic simulation or imitation of the behavior of a vehicle on a roadway, it has also been known to control the load machines of a powertrain test stand, i. e. the driven machines, by using a tire model. Either the speed (cf. AT 508 031 B1) or the torque (cf. EP 1 037 030 B1) of the driven machines may be controlled accordingly. It is the object of both methods to load the output of the powertrain more realistically and not to dampen the vibrations and, in particular, any natural frequencies of the test specimen on the test stand. Such a realistic load will obviously be achieved if the tire model is used for controlling the output (but not the input).

The US 2012/0166154 A1 relates to a slip simulation on the driven machines of a powertrain, whereby by using a tire model the test specimen on the test stand is to be subjected to a load correctly, i. e. realistically. Here, too, the reason for using a tire model on the test stand is to replace a real tire. The damping of natural frequencies, which is desired for a correct simulation, is accomplished by suitably setting a proportional and differential proportion in the speed controller.

The DE 10 2010 049 689 A1 also relates to a more realistic load of the test specimen if a real tire is replaced by a tire model. Its purpose is to simulate the tire by a better tire model on the test stand, whereby in particular by a detailed tire model, for instance, the flexing resistance, the influence of the tire temperature and the tire pressure, the proportion of roadway unevenness and dynamic tire loads etc. may be examined. Obviously, this makes only sense if instead of a real tire the tire model is used. In addition, the DE 10 2010 049 689 A1 indicates to determine individual controller parameters such as e. g. the P, I or D proportion of a PID controller on the basis of a tire model, a specific procedure not being disclosed here.

In the prior art, a tire model is used always expediently and with the sole purpose of replacing a real tire.

It is the object of the present invention to provide a method of the above given type or a device for carrying out this method, which avoids the above described vibrational problems in a simple and efficient manner or at least reduces them to an admissible degree. Problems in connection with time-delayed and time-shifted measured values are to be avoided and damping of relatively low-frequency vibrations is to succeed as well. In addition, the control is to be immune to measurement noise and achieve the desired damping also in transient examinations—in particular in the first examination of a test specimen.

To solve the object posed, the invention provides a method of the above given type, which is characterized in that the reference variable for the control of the torque of the driving machine is determined from a tire model of a virtual tire. In the control device indicated above, the invention accordingly provides that the outer control loop for controlling the reference variable of the inner control loop comprises a tire model of a virtual tire depending on a current speed of the driving machine. The invention is based on an unconventional and initially surprising use of the tire model in a place where normally (in a real setting) there are no tires. Therefore, the tire model is not used to replace a real tire (because such a tire does not exist in this place), but exclusively for its damping effect. The tire model used for controlling the driving, i. e. the driving machine of the powertrain test stand, does not result in a more realistic loading of the powertrain; only the damping effect of such a control is advantageously (also) used on the driving side. In this connection, the current speed of the driving machine (on which the virtual tire is positioned)—or an equivalent measured quantity—is inherently included in the tire model, however, it is not necessary to measure several speeds on the powertrain, so that problems resulting from the relative chronological behavior of several measured values may be avoided.

It is particularly favorable if the tire model establishes a preferably static correlation between the reference variable and a slip of the virtual tire or has such a correlation. The slip of the tire, which constitutes a prerequisite of an energy transmission, and a corresponding slip model are especially suited for the present method. In the case of a static correlation between the slip and the reference variable, i. e. the (modified) torque target value, influences of other—dynamic—measured quantities can be avoided completely.

In a particularly simple and thus preferred tire model, the reference variable is essentially calculated according to the formula $M_X = F_z \cdot r_{dyn} \cdot D \cdot \sin(C \cdot \arctan(B \cdot s))$ and/or the outer control loop for determining the reference variable is essentially adapted according to this formula, with $F_z$ being a contact force, $r_{dyn}$ a rolling radius, B, C and D constant tire-parameters and s a slip of the virtual tire. In this model, the reference variable shows a linear behavior only in a small area and the amount of abrupt changes is limited.

If a virtual roadway speed, which is included in the tire model, in particular in the slip of the virtual tire, is determined from an inverse tire model or if the outer control loop is adapted to determine a virtual roadway speed from an inverse tire model, the control of the driving machine (still) may be performed advantageously by predefining a desired torque. The inverse tire model can be chosen independently of the tire model. In particular, the inverse tire model does not have to correspond to the mathematical inverse of the tire model at all, but can be derived, for example, from a simplified tire model.

In this connection, it is advantageous if the virtual roadway speed is determined from the predefined value for the reference variable and a target speed of the driving machine, which target speed is preferably proportional to a target speed of the driven machine. Accordingly, the outer control loop is preferably adapted for determining the virtual roadway speed from a predefined value for the reference variable and a target speed of the driving machine. The exclusive use of predefined static quantities can prevent any feedbacks of dynamic measures quantities—besides the current speed of the driving machine—in the tire model.

Derivation of the inverse tire model is particularly simple if the inverse tire model makes or has a linear correlation between the virtual roadway speed and the target speed of the driving machine. The linear correlation can be used here, without having to incur any disadvantages with respect to the damping effect of the tire model, since the tire model (contrary to the inverse tire model) may very well have an at least partially non-linear correlation.

BRIEF DESCRIPTION OF THE FIGURES

Below, the invention will be illustrated by way of particularly preferred exemplary embodiments, however, to which it shall not be limited, and will be further explained with reference to the drawings, in which in detail.

DETAILED DESCRIPTION

Figure 1:
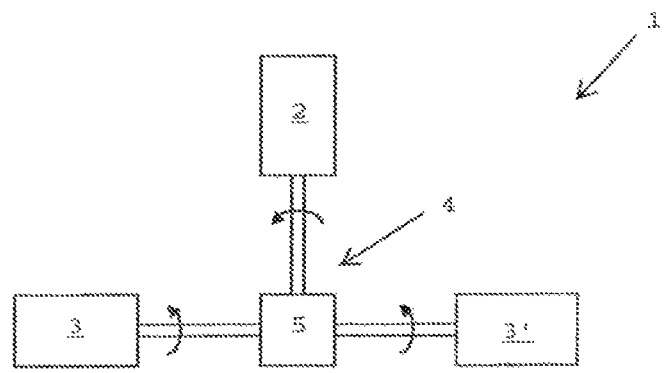
FIG. 1 schematically shows a powertrain test stand comprising a differential without matching gears.
Figure 2:
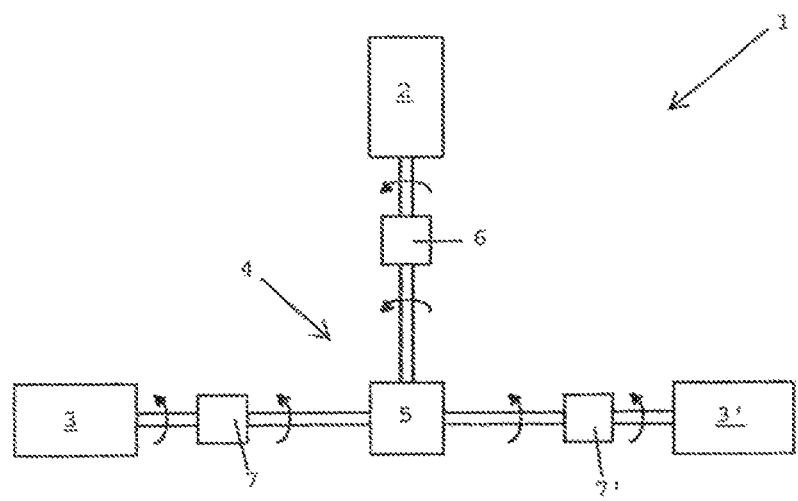
FIG. 2 schematically shows a powertrain test stand comprising a differential with matching gears on the driving side and the driven side.

FIG. 1 and FIG. 2 each show a powertrain test stand 1 comprising a driving machine 2 and two driven machines 3, 3', which are connected to a powertrain 4 to be tested. The powertrain 4 comprises a rear axle differential 5. In such a powertrain test stand 1, mostly only parts of a powertrain 4 are subjected to load with the help of driving machines 2 and driven machines 3, 3' in accordance with predefined speed and torque curves. Due to the gear ratio $i_D$ of the differential 5 the following applies for the angular velocities of the machines 2, 3, 3':

$$\omega_E = i_D \frac{\omega_{A1} + \omega_{A2}}{2} \quad (1)$$

wherein $\omega_E$ is the angular velocity of the driving machine 2, and $\omega_{A1}$ and $\omega_{A2}$, respectively are the angular velocities of the two driven machines 3, 3'. Furthermore, —apart from frictional losses in the differential 5—the following applies for the torques $$M_{A1} + M_{A2} = i_D M_E \quad (2)$$

To be able to subject the differential 5 to larger torques than can be supplied by the machines 2, 3, 3', frequently also matching gears 6, 7, 7', as shown in FIG. 2, are used. The matching gears 6 allocated to the driving machine 2 have a gear ratio $i_E$ and the matching gears 7, 7' allocated to the driven machines 3, 3' each have a gear ratio $i_A$. The matching gears 6, 7, 7' are used in such a way that the torques on the test specimen side, i. e. on the side of the powertrain 4 to be tested, are larger than on the machine side. Therefore, the following applies to the angular velocities $\omega_E$, $\omega_{A1}$, $\omega_{A2}$ of the machines 2, 3, 3':

$$\omega_E = i_E \omega_{GE}, \ \omega_{A1} = i_A \omega_{GA1}, \text{ and } \omega_{A2} = i_A \omega_{GA2}, \quad (3)$$

wherein $\omega_{GE}$ is the angular velocity on the driving-side matching gears 6, and $\omega_{GA1}$ and/or $\omega_{GA2}$ are the angular velocities on the two driven-side matching gears 7, 7'. For the torques—again apart from friction losses in the matching gears—follows:

$$M_{GE} = i_E M_E, \ M_{GA1} = i_A M_{A1}, \text{ and } M_{GA2} = i_A M_{A2}, \quad (4)$$

wherein—analogously to the angular velocities—$M_{GE}$ is the torque on the driving-side matching gears 6 and $M_{GA1}$ or $M_{GA2}$ are the torques on the two driven-side matching gears 7, 7'. Usually, for the purpose of testing on the test stand 1, the speeds $n_{A1}$, $n_{A2}$ of the driven side and the torque $M_E$ for the driving side are predefined. Accordingly, the driven machines 3, 3' are mainly operated in a speed-controlled manner and the driving machine 2 in a torque-controlled manner. Without any further measures, the construction on the test stand 1 oscillates in particular with the first natural frequency (inertia of the driving machine 2 due to rigidity of the shaft connections versus inertia of the driven machines 3, 3'). This problem is still aggravated with matching gears 6, 7, 7', since the test specimen 4 encounters considerably larger machine inertia due to the gear ratios $i_E$, $i_{A1}$, $i_{A2}$. Furthermore, the inertias and backlashes of the matching gears 6, 7, 7' themselves also have a negative effect on the oscillation behavior.

Figure 3:
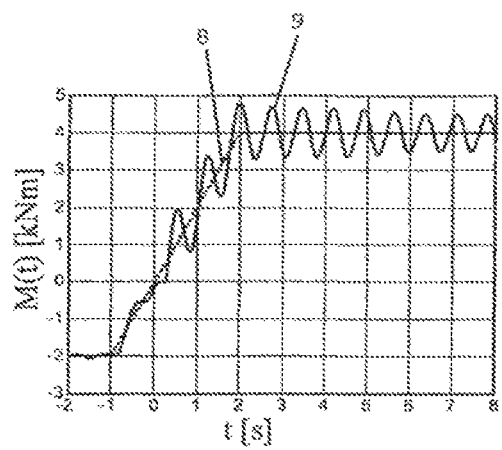
FIG. 3 shows a driving torque curve in a load change on a test stand according to the prior art for comparison.

FIG. 3 shows an example of a possible driving torque curve in the case of a load change (good excitation of the first natural frequency as a result of the hard impact after passing through the backlash). The broken line 8 represents the predefined value $M_{E,soll}$ of the torque of the driving machine 2, which value changes over time t (which is indicated on the abscissa). The solid line 9 represents the time course of the actually acting torque $M_E$. Of course, the extremely weakly damped, low-frequency oscillation of the torque $M_E$ shown here is undesired and should be reduced.

Figure 4:
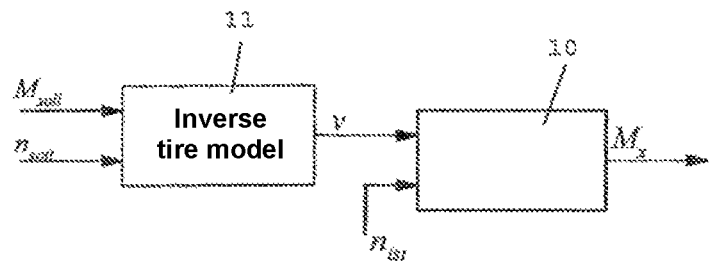
FIG. 4 schematically shows the principle of a control of the driving side with a virtual tire.

According to the present method for controlling the torque $M_E$ of the driving machine 2, a wheel with a tire is mounted virtually on the driving machine 2, which wheel is driving on a virtual roadway. The roadway velocity is chosen in such a way that the very desired torque $M_E$ results in stationary fashion together with the tire slip, i. e. according to a predefined value $M_{E,soll}$ (hereinafter abbreviated to $M_{soll}$). The principle of the control is schematically shown in FIG. 4. As is shown in FIG. 4, the reference variable M of the torque control for the driving machine 2, which reference variable is indicated as output value on the right-hand side, is obtained from the tire model represented by the block 10. Included in the tire model 10 are—apart from constant model parameters that are not shown here—the current speed $n_{E,ist}$ (abbreviated to $n_{ist}$) of the driving machine 2 as well as the virtual roadway speed v. The current driving-speed $n_{ist}$ is measured on the driving machine 2. The virtual roadway speed v is obtained from the inverse tire model represented by the second block 11. In general, the inverse tire model 11 does not correspond to the inverse of the tire model 10, but for example pertains to a simplified tire model which is easier to be inverted. Included n the inverse tire model 11 are again apart from own constant model parameters a target speed $n_{E,soll}$ (abbreviated to $n_{soll}$) of the driving machine 2 as well as the predefined value $M_{soll}$ for the torque $M_E$ of the driving machine 2.

The tire models on which the tire model 10 and the inverse tire model 11 are based may be any type of tire model, i. e. a model that is suited to approximate the transmission behavior of a wheel with a tire and/or comprises comparable damping properties. Below, a simplified tire model will be described in an exemplified manner, which is based on the so-called "magic formula" by Pacejka (cf. Pacejka. H., "Tyre and Vehicle Dynamics" $2^{nd}$ ed., Butterworth-Heinemann, Oxford, 2007). However, one could also assume another tire model having similar qualitative properties, e. g. the model "TMsimple" by Hirschberg (cf. Hirschberg W., "TMsimple Application Manual", 2007), the model "TMeasy" by Rill (cf. Rill G., "*Simulation von Kraftfahrzeugen*", published by Vieweg-Verlag, Regensburg, 2007), the "*Hohenheimer Reifenmodell*" or the "Tame-Tire" tire model developed by the Michelin company, wherein advantageously a version as simple as possible is used for the present method.

The starting point in the shown model is a wheel having the angular velocity $\omega_R$ and the—here assumed to be constant—dynamic rolling radius $r_{dyn}$ as well as a roadway speed v. Alternatively, the dynamic rolling radius $r_{dyn}$ can be varied slightly depending on the roadway speed v (or the corresponding vehicle velocity), e. g. according to a polynomial approach, however, the possible influence of such a modification on the damping effect has turned out to be negligible. With the above quantities, a slip of the virtual tire can be given as follows $$s = \frac{r_{dyn} \omega_R - v}{\max(v_{low}, |v|)} \quad (5)$$

wherein the limit speed $V_{low}$ prevents a division by zero. The literature also indicates other definitions of slip; the one shown here is the variant preferred by Pacejka. (An alternative will be explained below). With this slip s, by means of the simple "magic formula" for the longitudinal movement, the friction value μ can be calculated from $$\mu(s) = D \sin(C \arctan(B \cdot s)) \quad (6)$$

with the three tire parameters B, C, and D.

Figure 5:
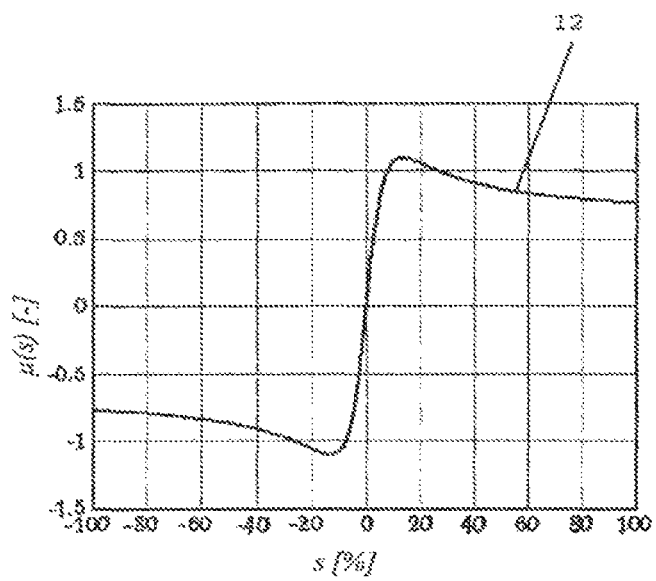
FIG. 5 shows a characteristic curve of friction coefficient and slip according to a typical tire model.

FIG. 5 shows a characteristic curve 12 of friction coefficient versus slip for a typical tire. With the contact force $F_z$ between the virtual tire and the virtual roadway now the longitudinal force acting in the tire contact surface $$F_x = \mu F_z \quad (7)$$

can be calculated, and finally the torque acting due to the slip s $$M_x = F_x r_{dyn} = F_z r_{dyn} D \sin(C \arctan(B \cdot s)) \quad (8)$$

Normally, the rolling friction is also taken into consideration in a tire model. To simplify the present control, any modeling of the rolling friction is dispensed with here. A bodywork model might be used for the contact force $F_z$; for the sake of simplicity, however, a constant contact force $F_{z,0}$ is chosen. With these simplifications and if the equation (5) is used in equation (8), $$M_x = F_{z,0} \cdot r_{dyn} \cdot D \cdot \sin\left(C \cdot \arctan\left(B \cdot \frac{r_{dyn}\omega_R - v}{\max(v_{low}, |v|)}\right)\right) \quad (9)$$

helps to obtain the correlation between torque $M_x$, angular velocity $\omega_R$ and roadway speed v in the case of a certain constant contact force $F_{z,0}$. In the control according to FIG. 4, the converted current speed $n_{E,ist}$ (abbreviated to $n_{ist}$) of the driving machine 2 is used for the angular velocity $\omega_R$:

$$\omega_R = \frac{\pi}{30} n_{ist} \quad (10)$$

Indeed, calculating the suitable roadway speed v for a predefined value $M_{soll}$ of the torque $M_E$ and a current speed $n_{ist}$ is possible but very complex. Perhaps there are also several solutions or no solution at all due to the non-linear characteristic curve of friction coefficient and slip (cf. FIG. 5). A reasonable simplification in this context is to use instead of the non-linear characteristic curve of friction coefficient and slip a linear characteristic curve $$\mu(s) = k \cdot s \quad (11)$$

having a gradient k, the gradient being best selected just like in the origin of the non-linear characteristic curve of friction coefficient and slip; then, the following will apply:

$$k = B \cdot C \cdot D \quad (12)$$

Thus, the equation (9) is simplified to read as follows:

$$M_x = F_{z,0} \cdot r_{dyn} \cdot k \cdot \frac{r_{dyn}\omega_R - v}{\max(v_{low}, |v|)} \quad (13)$$

and one may eliminate for the road way speed in order to arrive at a simplified inverse tire model:

$$v = \begin{cases} \dfrac{F_{z,0} r_{dyn}^2 k \omega_R}{F_{z,0} r_{dyn} k + M_z} & \text{for } v \geq v_{low} \\ \dfrac{F_{z,0} r_{dyn}^2 k \omega_R - M_x v_{low}}{F_{z,0} r_{dyn} k} & \text{for } |v| \leq v_{low} \\ \dfrac{F_{z,0} r_{dyn}^2 k \omega_R}{F_{z,0} r_{dyn} k - M_x} & \text{for } v \leq -v_{low} \end{cases} \quad (14)$$

To determine the roadway speed v from the inverse tire model according to equation (14), the predefined value $M_{soll}$ is used for the torque $M_x$ and the converted target speed $n_{E,soll}$ of the driving machine 2 for the angular velocity $\omega_R$:

$$M_x = M_{soll} \quad (15)$$

$$\omega_R = \frac{\pi}{30} \cdot n_{E,soll}$$

The target speed $n_{E,soll}$ of the driving machine 2 is calculated from the target speeds $n_{A1,soll}$ and $n_{A2,soll}$ of the driven machines 3, 3' in consideration of the applicable gear ratio $i_D$, $i_E$. In the case of the powertrain test stand 1 with matching gears 6, 7, 7' according to FIG. 2, the following approximately follows for the target speed $n_{E,soll}$ of the driving machine 2

$$n_{E,soll} = i_E i_D \frac{n_{A1,soll} + n_{A2,soll}}{2} \quad (16)$$

Figure 6:
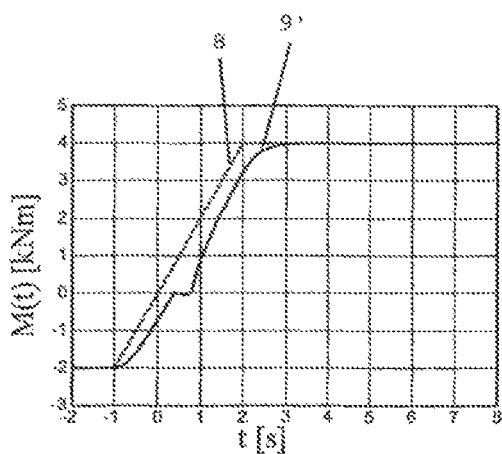
FIG. 6 shows a driving torque curve in a load change under the present control method for comparison.

FIG. 6 shows the—in comparison to FIG. 3—dramatic improvement of the driving torque curve 9' in a load change, i. e. a variation 8 of the predefined value $M_{soll}$. Here, the reference variable $M_x$ for the torque control of the driving machine 2 was dynamically determined on the basis of the tire model according to equation (9) with the roadway velocity according to the inverse tire model according to equation (14).

Alternatively to the static relationship of the slip s to the angular velocity $\omega_R$ and roadway speed v given in equation (5) the damping effect of the virtual tire can especially be improved by a detailed description, which takes into consideration the dynamics of the force build-up. For instance, the literature indicates the so-called "contact point model" (single contact point transient tyre model, cf. Pacejka, 2007), in which a contact point between the tire and the roadway is subjected to a certain deflection u from the rest position due to the differences in velocity, which deflection is described by the differential equation $$\frac{du}{dt} = -\frac{|v|}{\sigma_\kappa} u - v_{sx} \quad (17)$$

with the slip speed $$v_{sx} = v - r_R \omega_R \quad (18)$$

and the maximum deflection $\sigma_K$ (relaxation length). On principle, the slip s could be calculated with $$s = \frac{u}{\sigma_\kappa} \quad (19)$$

To achieve a better damped behavior at lower speeds, too, Pacejka suggests the calculation according to $$s = \frac{u}{\sigma_\kappa} - \frac{k_{v,low}}{c_{Fk}} v_{sx} \quad (20)$$

with $$k_{v,low} = \begin{cases} \frac{1}{2} k_{v,low\,0} \left[1 + \cos\left(\pi \frac{|v|}{v_{low}}\right)\right] & \text{for } |v| \leq v_{low} \\ 0 & \text{for } |v| > v_{low} \end{cases} \quad (21)$$

and the slip rigidity $c_{Fx}$.

The present method or the present control device is by no means limited to a certain tire model. Alternatively to the model of Pacejka (the "magic formula") given in equation (6), for example, the tire model "TMsimple" of Hirschberg having the fundamental formula $$\mu(s) = K \sin\left[B\left(1 - e^{\frac{-|s|}{A}}\right) \operatorname{sign}(s)\right] \quad (22)$$

wherein K, B, and A are model parameters, or the tire model "TMeasy" of Rill having the fundamental formula $$\mu(s) = \quad (23)$$

$$\begin{cases} s_M \mu_0' \dfrac{\sigma}{1 + \sigma\left(\dfrac{s_M}{f_M}\mu_0' - z + \sigma\right)} \text{ with } \mathit{mit}\ \sigma = \dfrac{s}{s_M} & \text{for } 0 \le s \le s_M \\ \mu_M - (\mu_M - \mu_G)\sigma^2(3 - \text{ with } \mathit{mit}\ \sigma = \dfrac{s - s_M}{s_G - s_M} & \text{for } s_M \le s \le s_G \\ \mu_G & \text{for } s_G \le s \end{cases}$$

wherein $S_M$, $S_G$, $f_M$, $\mu_o'$, and $\mu_G$ are (partially depending) model parameters can be used.

Figure 7:
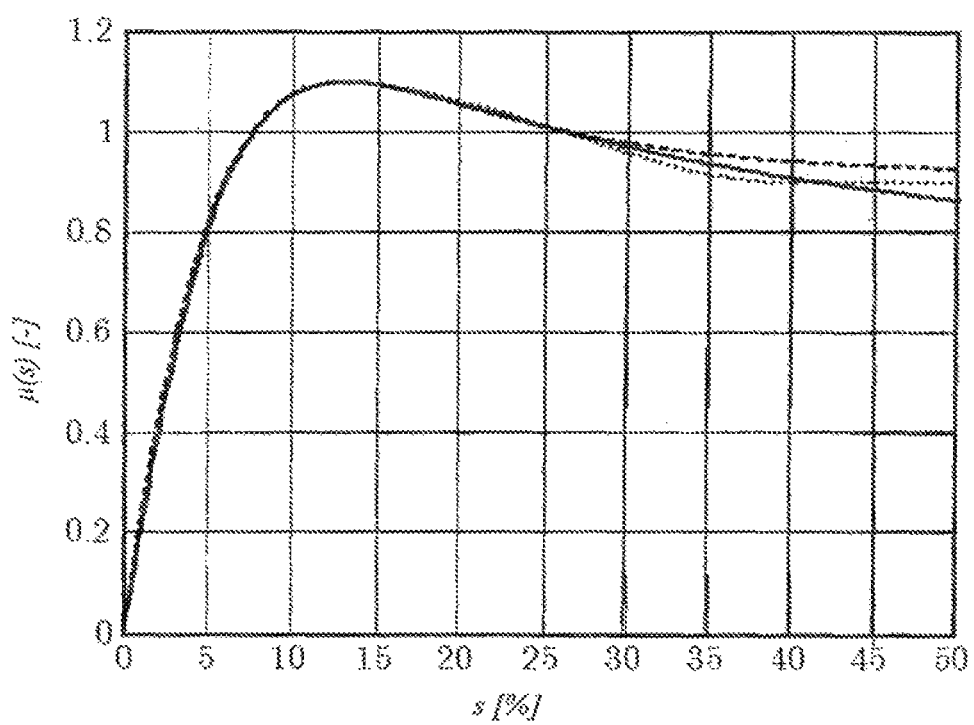
FIG. 7 shows a diagram of the characteristic curves of friction coefficient and slip according to three different tire models in comparison.

The characteristic curves of friction coefficient and slip resulting from the indicated tire models are very similar, i.e. they have—at least in the area of interest—a very similar curve. The curves of the three given tire models are drawn in the diagram shown in FIG. 7, wherein only the first quadrant of the coordinate system is shown due to lack of space. The curve in the third quadrant is analogous in each case (cf. FIG. 5). The solid line in FIG. 7 represents the "magic formula" of Pacejka (cf. equation (6)), the broken line represents the "TMsimple" model (cf. equation (22)) and the dotted line the "TMeasy" model (cf. equation 23)).

Depending on the choice of the model and the model parameters, of course, any curves having a quantitatively larger deviation may be provided as well. FIG. 7 shows the qualitative behavior of the reference variable obtained in general by tire models, in particular, with a continuous curve of the characteristic curve of friction coefficient and slip, which increases initially approximately linearly starting from a zero point, subsequently levels off and finally monotonously drops with even more increasing slip.

The invention claimed is:

1. A method for controlling a powertrain test stand comprising with a driving machine and a driven machine, the method comprising:
    controlling a torque supplied by the driving machine according to a reference variable ($M_x$),
    determining a virtual roadway speed (v), which is included in a tire model of a virtual tire, from an inverse tire model,
    determining the reference variable ($M_x$) for controlling the torque of the driving machine from the tire model of the virtual tire, and
    modifying the reference variable ($M_x$) depending on a current speed ($n_{ist}$) of the driving machine in relation to a redefined value ($M_{soll}$) in order to dampen vibrations between the driving machine and the driven machine.

2. The method according to claim 1, wherein the virtual roadway speed (v) is included in a slip of the virtual tire in the tire model.

3. The method according to claim 1, further comprising: with the tire model, correlating the reference variable ($M_x$) with a slip of the virtual tire.

4. The method according to claim 3, further comprising: calculating the reference variable ($M_x$) essentially according to the formula $M_x = F_z \cdot r_{dyn} \cdot D \cdot \sin(C \cdot \arctan(B \cdot s))$, with $F_z$ being a contact force, $r_{dyn}$ a rolling radius, B, C, and D constant parameters, and s the slip of the virtual tire.

5. The method according to claim 3, wherein the correlation between the reference variable ($M_x$) and the slip of the virtual tire is a static correlation.

6. The method according to claim 1, further comprising: determining the virtual roadway speed (v) from the predefined value ($M_{soll}$) for the reference variable ($M_x$) and a target speed ($n_{soll}$) of the driving machine.

7. The method according to claim 6, further comprising: with the inverse tire model, establishing a linear correlation between the virtual roadway speed (v) and the target speed ($n_{soll}$) of the driving machine.

8. The method according to claim 6, wherein the target speed ($n_{soll}$) of the driving machine is proportional to a target speed of the driven machine.

9. A control device of a powertrain test stand comprising a driving machine and a driven machine, to perform the method according to claim 1, the control device comprising:
    an inner control loop for controlling a torque applied by the driving machine, and
    an outer control loop for controlling the reference variable ($M_x$) of the inner control loop as a function of the current speed ($n_{ist}$) of the driving machine,
    wherein the outer control loop comprises the tire model of the virtual tire.

10. The control device according to claim 9, wherein the outer control loop is adapted to determine the virtual roadway speed (v), which is included in a slip of the virtual tire in the tire model, from the inverse tire model.

11. The control device according to claim 9, wherein the tire model comprises a correlation between the reference variable ($M_x$) and a slip of the virtual tire.

12. The control device according to claim 11, wherein the outer control loop is adapted to determine the reference variable ($M_x$) essentially in accordance with the formula $M_x = F_z \cdot r_{dyn} \cdot D \cdot \sin(C \cdot \arctan(B \cdot s))$, with $F_z$ being a contact force, $r_{dyn}$ a rolling radius, B, C, and D constant parameters, and s the slip of the virtual tire.

13. The control device according to claim 11, wherein the correlation between the reference variable ($M_x$) and the slip of the virtual tire is a static correlation.

14. The control device according to claim 9, wherein the outer control loop is adapted to determine the virtual roadway speed (v), which is included in the tire model from the inverse tire model.

15. The control device according to claim 14, wherein the outer control loop is adapted to determine the virtual roadway speed (v) from a predefined value ($M_{soll}$) for the reference variable ($M_x$) and a target speed ($n_{soll}$) of the driving machine.

16. The control device according to claim 15, wherein the inverse tire model establishes a linear correlation between the virtual roadway speed (v) and the target speed ($n_{soll}$) of the driving machine.

17. The control device according to claim 15, wherein the target speed ($n_{soll}$) is proportional to a target speed of the driven machine.

* * * * *